United States Patent [19]
Kimura et al.

[11] Patent Number: 5,497,150
[45] Date of Patent: Mar. 5, 1996

[54] IMAGE SCANNER

[75] Inventors: Takuji Kimura; Tang L. Lee, both of Tokyo, Japan

[73] Assignee: SMK Corporation, Tokyo, Japan

[21] Appl. No.: 42,828

[22] Filed: Apr. 5, 1993

[51] Int. Cl.⁶ .................................. H03M 1/22
[52] U.S. Cl. .................. 341/1; 358/473; 382/313; 364/565
[58] Field of Search .................. 358/473; 382/59; 345/164; 364/565; 341/1

[56] References Cited

U.S. PATENT DOCUMENTS 5,115,227 5/1992 Keiji ........................................ 345/164

Primary Examiner—William M. Shoop, Jr.
Assistant Examiner—Albert Paladini
Attorney, Agent, or Firm—Peter Jon Gluck; Morrison Law Firm; Lawrence Ian Wechsler

[57] ABSTRACT

A hand-held image scanner can scan an object larger than the scanner itself. Successive multiple partial images scanned in the Y (or longitudinal) direction) are combined to form a single image by keeping track of the position and motion of the scanner in both the Y direction and the X (or latitudinal) direction. The scanner measures distance moved in either the X or the Y direction, but it cannot measure in both directions at once, nor does it scan when it moves in the X direction.

3 Claims, 4 Drawing Sheets

IMAGE SCANNER

BACKGROUND OF THE INVENTION

The present invention relates to an image scanner, and, more particularly, to a hand-held image scanner capable of scanning an entire object that is bigger than the scanner itself.

In the prior art, described below with reference to FIG. 6, an image scanner has a housing with a cover. Depressing a switch on the cover causes a beam of light to shine on an object to be scanned. The beam reflected from the object is in turn reflected by mirrors, passes through a slit, and forms an image on a charge-coupled device ("CCD") with the help of a lens. The image is converted by the CCD into an electrical signal that can be transmitted to an external device.

The prior-art image scanner scans in two dimensions, X and Y. In the Y (or length) direction the scanner measures the distance moved along the scanned object by rotating a measuring wheel coupled with a disk and a photo interrupter. The two-dimensional image thus formed has a length of Y and a width X equal to the width of the slit. A finder lets the scanner operator make sure of the scanner's position.

This prior-art scanner cannot scan an image wider than the slit through which the light beam passes. Other prior-art scanners, which can scan an image bigger than the width of the slit, require an optional device attached to the scanner that enlarges the system itself so that it becomes equal to or larger than the object to be scanned.

OBJECT AND SUMMARY OF THE INVENTION

An object of the present invention is to provide a hand-held image scanner that overcomes the drawbacks of the prior art.

A further object of the present invention is to provide a hand-held image scanner that can scan in two dimensions an object whose size is unlimited. By tracking its own motion in X and Y coordinates, the scanner combines multiple images into a single image, so that an object bigger than the scanner itself can be scanned.

Briefly stated, the present invention provides a hand-held image scanner that can scan an object larger than the scanner itself. Successive multiple partial images scanned in the Y (or longitudinal) direction) are combined to form a single image by keeping track of the position and motion of the scanner in both the Y direction and the X (or latitudinal) direction. The scanner measures distance moved in either the X or the Y direction, but it cannot measure in both directions at once, nor does it scan when it moves in the X direction.

According to an embodiment of the invention, there is provided a hand-held image scanner comprising: a housing; a pair of first rollers retractably disposed within said housing; said first rollers being capable of rotational motion in a first direction; a pair of second rollers retractably disposed within said housing; said second rollers being capable of rotational motion in a second direction; said first rollers being mounted at right angles to said second rollers; an opening within said housing through which light transmitted from a light source passes; said opening also receiving light reflected from said object passes, thereby forming at least one reflected image of said object on an image detector; said opening being disposed parallel to said first rollers; said first rollers being coupled to a first direction movement detector; said first rollers being held in substantial contact with said object in an initial condition; said first direction movement detector being capable of determining distance moved in said first direction; said second rollers being coupled to a second direction movement detector; said second rollers being held in a retracted position out of contact with said object in an initial condition; said second direction movement detector being capable of determining distance moved in said second direction; and means for retracting said first rollers and placing said second rollers in contact with said object, whereby said scanner generates a plurality of sets of coordinates of position from said object, each of said plurality being associated with said at least one reflected image.

According to a feature of the invention, there is provided a scanner comprising: a housing; at least a first roller effective for rolling in a first direction along an object; at least a second roller effective for rolling in a second direction along said object; said first and said second directions being angularly displaced from each other; first detecting means for detecting motion of said first roller; second detecting means for detecting motion of said second roller; first means, effective when said first roller rolls in said first direction, for maintaining said second roller out of contact with said object; and second means, effective when said second roller rolls in said second direction, for maintaining said first roller out of contact with said object.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
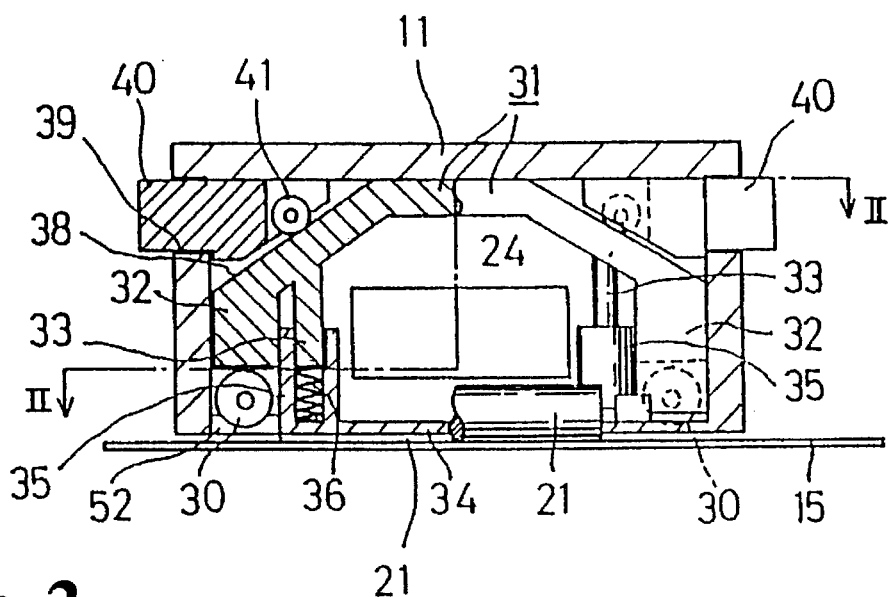
FIG. 1 is a cross-sectional view, along line I—I of FIG. 2, of a device according to a first embodiment of the present invention.
Figure 2:
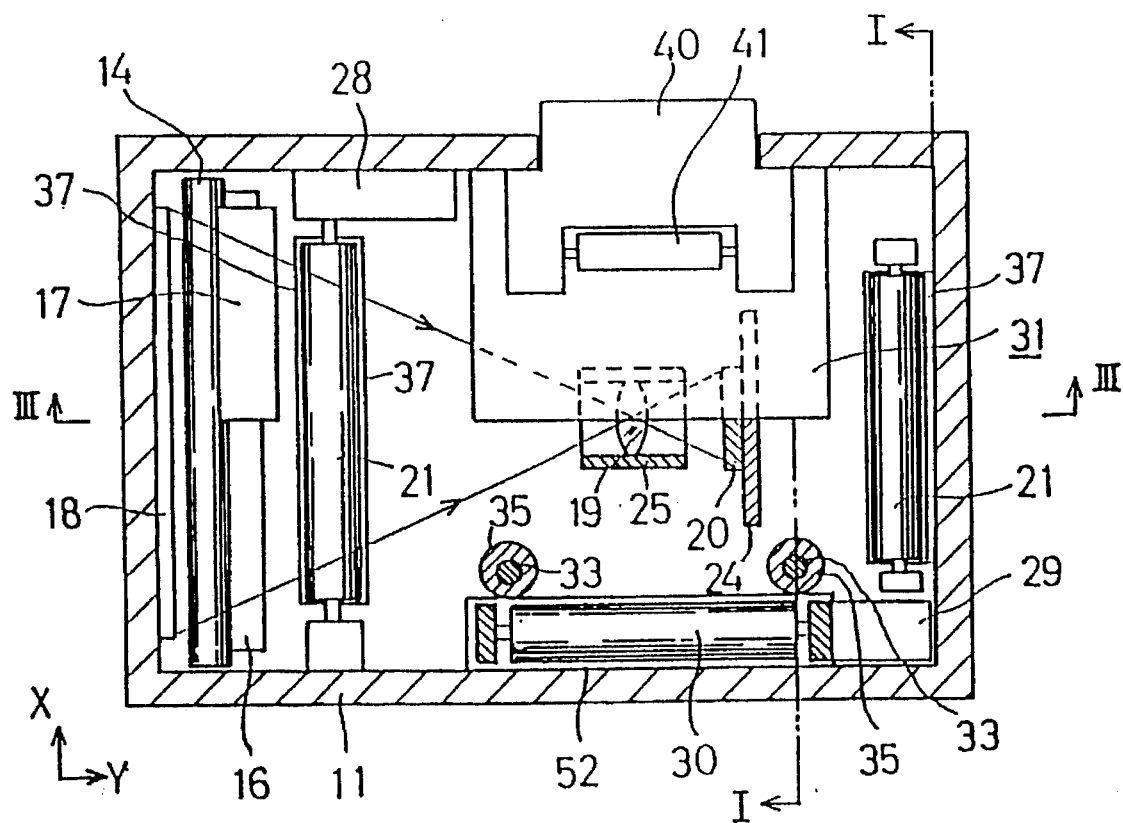
FIG. 2 is a cross-sectional view, along line II—II of FIG. 1, of a device according to a first embodiment of the present invention.
Figure 3:
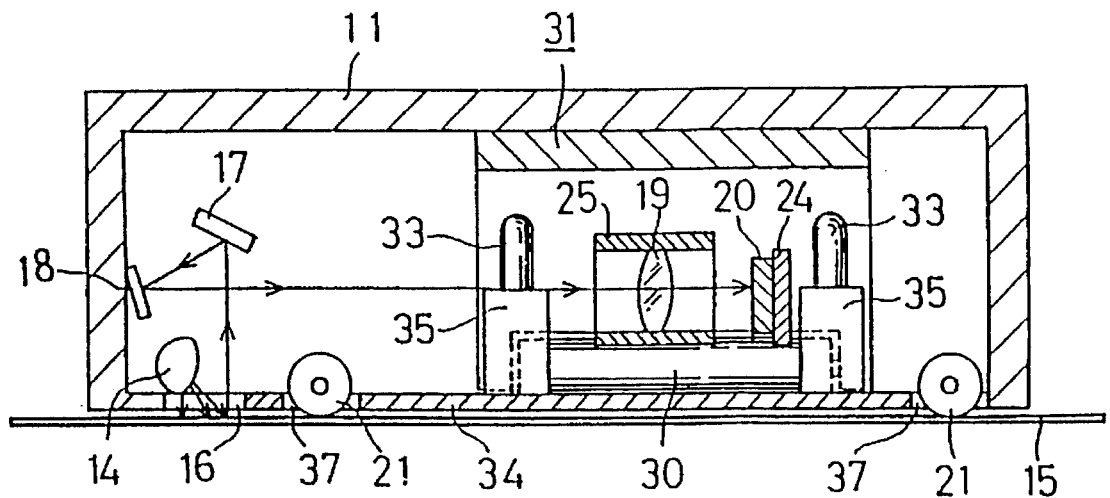
FIG. 3 is a cross sectional view, along line III—III of FIG. 2, of a device according to a first embodiment of the present invention.

Referring to FIGS. 1 to 3, slit 16 is disposed in an X-direction, that is, normal to the direction of scanning, at a bottom 34 of a housing 11 of a hand-held image scanner 10. A pair of rectangular openings 37 are disposed at opposite ends of bottom 34 in the X direction parallel to slit 16. A pair of Y-direction rollers 21 are rotatably attached above rectangular openings 37. The lower portions of Y-direction rollers 21 normally protrude through openings 37 in a position where they can contact an object positioned beneath bottom 34 of housing 11.

A Y-direction movement detector (or a Y-axis encoder) 28 is coupled to a shaft of either one of the pair of Y-direction rollers 21 to detect a distance moved in the Y direction. Y-direction movement detector 28 is a conventional device that uses a photo interrupter disc, a light source, and a detector (none of which are shown) to produce a pulse output related to the distance that housing 11 moves in the Y direction.

A light source 14 in housing 11 projects light through slit 16 to illuminate a narrow strip of an object 15. The light reflected from object 15 back through slit 16 is further reflected by a pair of mirrors 17, 18 and focused by a lens 19 to form an image on a CCD 20.

A pair of X-direction rollers 30 is disposed above a pair of rectangular openings 52 on opposite sides of bottom 34 of housing 11. The axes of rollers 30 are parallel to the Y direction and at right angles to Y direction rollers 21. X-direction rollers 30 are initially held within housing 11, out of contact with object 15.

A sliding body 31 is movably disposed in housing 11. Sliding body 31 has a pair of sloping surfaces 38. X-direction rollers 30 are rotatably attached to the bottom of a pair of vertical portions 32 of sliding body 31. X-direction rollers 30 are disposed above rectangular openings 52 on bottom 34. A piston 33 is integrally formed at each of the four corners of sliding body 31. Pistons 33 are each slidably fitted into a cylinder 35 on bottom 34. A spring 36 in each cylinder 35 urges each piston 33 upward from bottom 34, thus normally holding X-direction rollers 30 in the elevated positions shown in FIG. 1.

A pair of horizontal openings 39 at opposite sides of housing 11 face sloping surfaces 38. A pair of movable bodies 40 are movably arranged in horizontal openings 39. A pair of pushing rollers 41, each rotatably affixed to a movable body 40, contacts sloping surfaces 38.

A conventional X-direction movement detector (or an X-axis encoder) 29 is coupled to a shaft of either of X-direction rollers 30 to detect the distance that housing 11 is displaced in the X direction while X direction rollers 30 are lowered and in contact with object 15.

X-direction movement detector 29 may be of any conventional type. In the preferred embodiment, X-direction movement detector 29 includes a photo interrupter disc with a light source and a photodetector that produces pulses related to the amount of displacement in the X direction.

Figure 5:
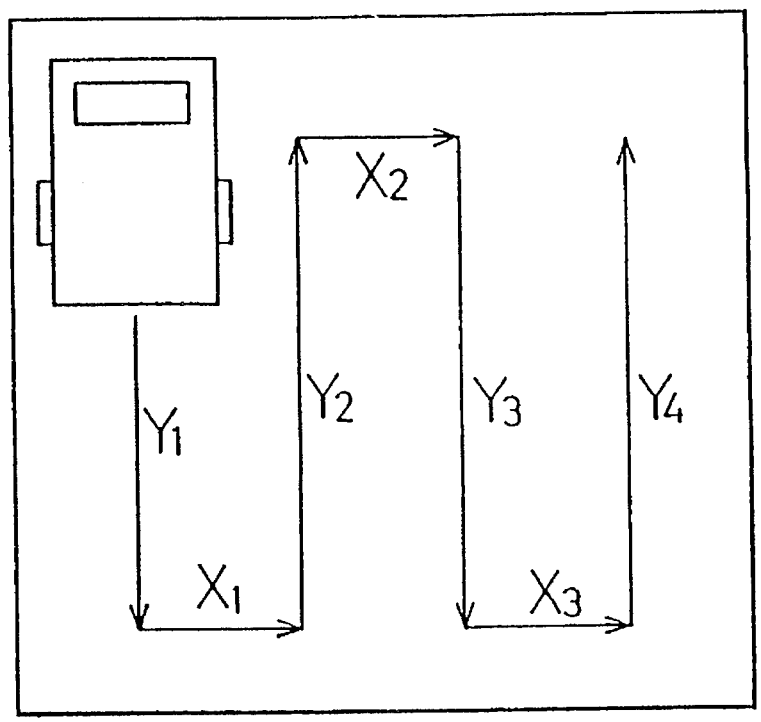
FIGS. 5A and 5B are schematic views that illustrate how a scanner of the present invention can scan an image larger than the scanner itself.
Figure 5:
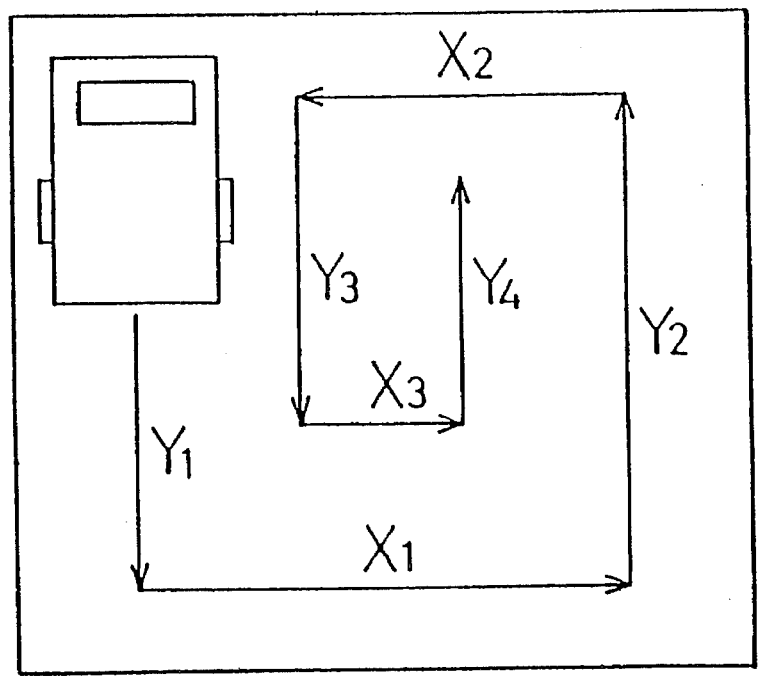
Figure 6:
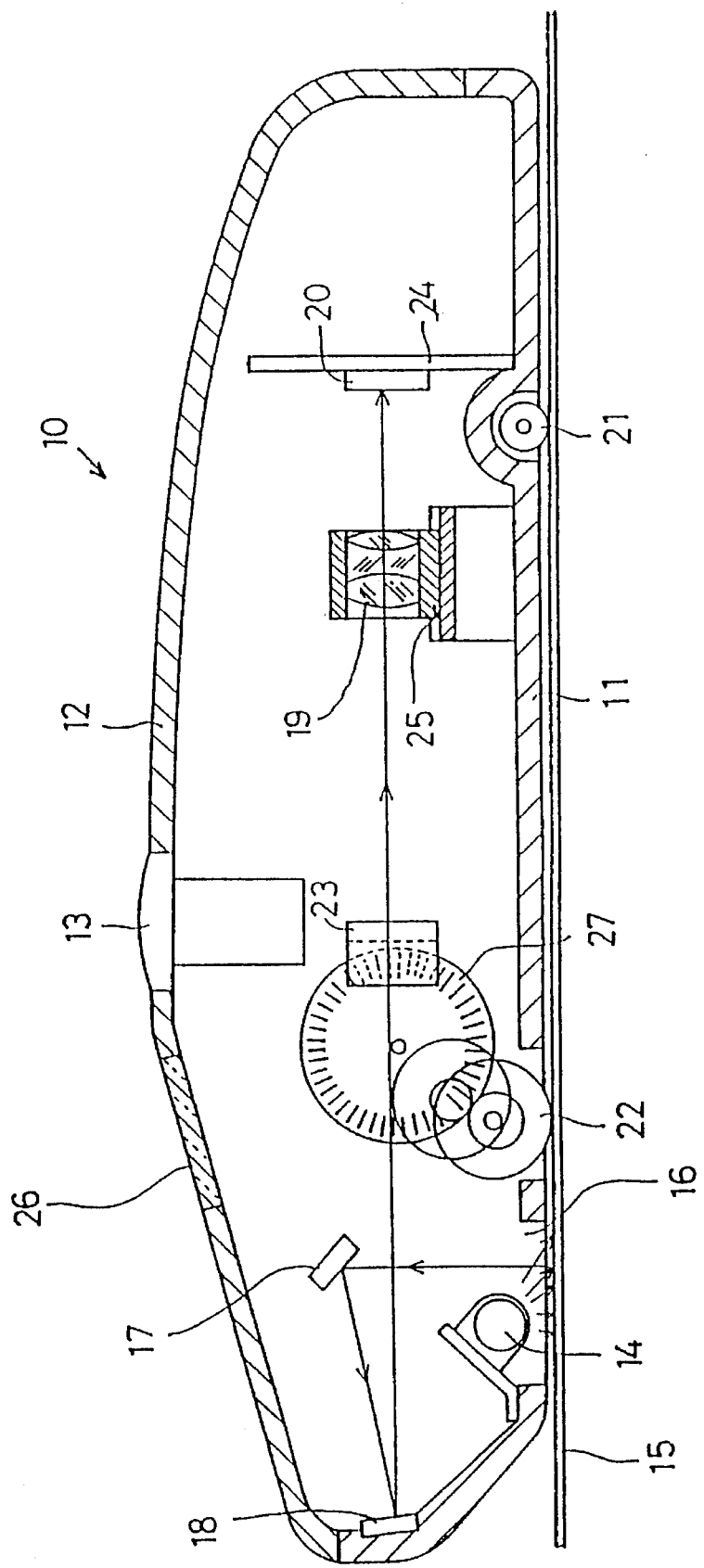
FIG. 6 is a cross-sectional view of an image scanner of the prior art.

Referring now to FIG. 5(a), housing 11 may be moved in either the X or Y direction. When housing 11 is moved in the Y direction, Y-direction rollers 21 contact object 15, and X-direction rollers 30 remain retracted to permit housing 11 to roll only on Y-direction moving rollers 21 along a path Y1. To move housing 11 in the X direction along path X1, movable bodies 40 (FIG. 1) are pushed inward, thereby forcing pushing rollers 41 against sloping surfaces 38. Sliding body 31 is urged downward against springs 36, thereby forcing X-direction rollers 30 to protrude through rectangular openings 52 and come into contact with object 15. The downward movement of X-direction rollers 30 raises housing 11 upward until Y-direction rollers 21 are raised clear of object 15. Scanner 10 can then move along path X1.

Motion in the X direction along path X1 precludes motion in the Y direction along path Y2. Only when movable bodies 40 are released can springs 36 raise sliding body 31, thereby permitting housing 11 to descend until Y-direction rollers 21 again come into contact with object 15. X-direction rollers 30 are raised out of contact with object 15. This process of shifting between X-direction and Y-direction motion is repeated for the remaining paths X2, Y3, X3, and Y4, until the entire surface of object 15 is scanned.

The above procedure, where Y-direction rollers 21 monitor motion along the Y axis, and X-direction rollers 30 monitor motion along the X axis, permits an apparatus receiving the scanning signal and the two motion signals to reconstruct the entire motion. Thus the images taken along the Y-axis portions of the scans can be aligned both longitudinally and latitudinally to form a composite image of the entire object 15, no matter what its size. The apparatus receiving the scanning signal may be of any convenient type. In the preferred embodiment, this apparatus is a computer; most preferably, a personal computer.

The image data on paths Y1, Y2, Y3, and Y4 are combined into a single aligned image by recognizing the (X, Y) positions of the image portions from the direction and distance elements along X1, X2, X3, Y1, Y2, Y3, and Y4.

Referring now to FIG. 5(b), another possible scanning pattern is shown that is a general spiral pattern, instead of the back-and-forth or raster scanning pattern of FIG. 5(a).

Figure 4:
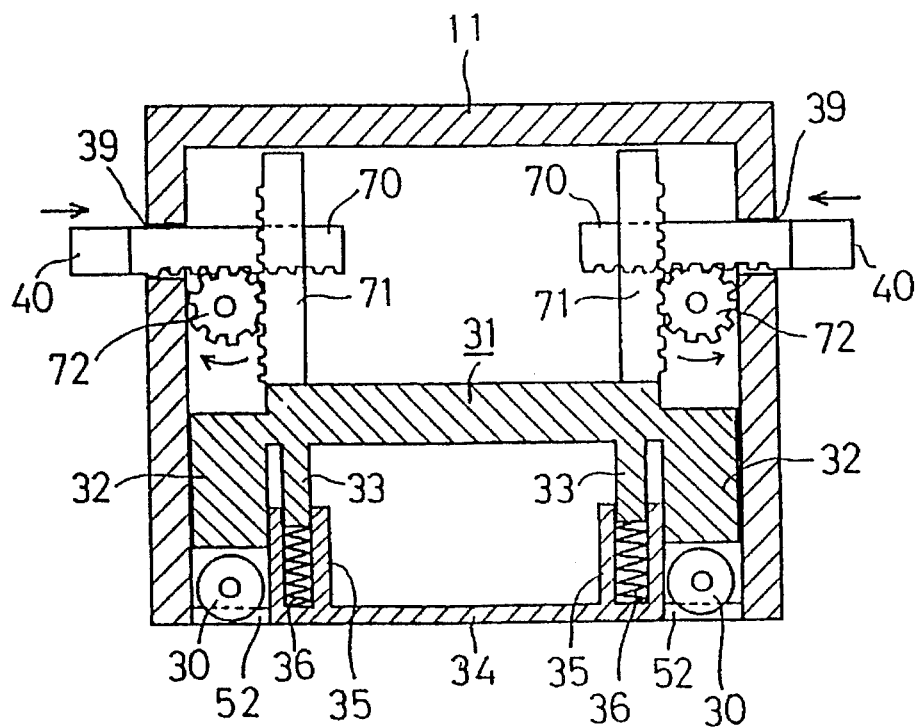
FIG. 4 is a cross-sectional view of a device according to a second embodiment of the present invention.

Referring to FIG. 4, a second embodiment of the invention includes a pair of horizontal racks 70 integrally attached to movable bodies 40. A pair of vertical racks 71 are attached to sliding body 31. A pair of pinions 72 engage respective horizontal racks 70 and vertical racks 71 to produce concerted movement thereof. A horizontal force applied to movable bodies 40 moves horizontal racks 70 inward, thus rotating pinions 72. Pinions 72 move vertical racks 71 downward, in turn moving X-direction rollers 30 into contact with object 15. The remainder of the operation of the embodiment of FIG. 4 is the same as in the previous embodiment; its detail is therefore omitted.

Other techniques can be used to move sliding body 31 up and down, without departing from the spirit and scope of the invention. For example, instead of using racks and a pinion, as in FIG. 4, a wire wound on a spool can be retracted and released by movement of movable bodies 40, thereby moving sliding body 31 upward and downward. Still other techniques such as, for example, cams, levers, or electrical solenoids, may be substituted without departing from the invention. Also, other convenient devices may be substituted for spring 36, cylinder 35, and piston 33 without changing the concept of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hand-held image scanner comprising:

a housing;

a pair of first rollers retractably disposed within said housing;

said first rollers being capable of rotational motion in a first direction;

a pair of second rollers retractably disposed within said housing;

said second rollers being capable of rotational motion in a second direction;

said first rollers being mounted at right angles to said second rollers;

an opening within said housing through which light transmitted from a light source passes;

said opening also receiving light reflected from said object passes, thereby forming at least one reflected image of said object on an image detector;

said opening being disposed parallel to said first rollers;

said first rollers being coupled to a first direction movement detector;

said first rollers being held in substantial contact with said object in an initial condition;

said first direction movement detector being capable of determining distance moved in said first direction;

said second rollers being coupled to a second direction movement detector;

said second rollers being held in a retracted position out of contact with said object in an initial condition;

said second direction movement detector being capable of determining distance moved in said second direction; and means for retracting said first rollers and placing said second rollers in contact with said object, whereby said scanner generates a plurality of sets of coordinates of position from said object, each of said plurality being associated with said at least one reflected image.

2. An image scanner having an enlarged effective aperture comprising:

a housing;

at least a first roller effective for rolling in a first direction along an object;

at least a second roller effective for rolling in a second direction along said object;

said first and said second directions being angularly displaced from each other;

first detecting means for detecting motion of said first roller;

second detecting means for detecting motion of said second roller;

first means, effective when said first roller rolls in said first direction, for maintaining said second roller out of contact with said object;

second means, effective when said second roller rolls in said second direction, for maintaining said first roller out of contact with said object; and, wherein said second means includes means for moving said second rollers into contact with said object, thereby raising said housing and lifting said first rollers out of contact with said object.

3. An image scanner having an enlarged effective aperture comprising:

a housing;

at least a first roller effective for rolling in a first direction along an object;

at least a second roller effective for rolling in a second direction along said object;

said first and said second directions being angularly displaced from each other;

first detecting means for detecting motion of said first roller;

second detecting means for detecting motion of said second roller;

first means, effective when said first roller rolls in said first direction, for maintaining said second roller out of contact with said object; and second means, effective when said second roller rolls in said second direction, for maintaining said first roller out of contact with said object, wherein said first means includes resilient urging of said second rollers into said housing, out of contact with said object.

* * * * *